United States Patent
Liao et al.

(10) Patent No.: US 9,361,699 B2
(45) Date of Patent: Jun. 7, 2016

(54) IMAGING SYSTEM AND METHOD

(75) Inventors: Chao Kang Liao, New Taipei (TW); Chi Hao Wu, Taipei (TW)

(73) Assignee: IMEC Taiwan Co., Hsinchu (TW)

( * ) Notice: Subject to any disclaimer, the term of this patent is extended or adjusted under 35 U.S.C. 154(b) by 97 days.

(21) Appl. No.: 13/535,030

(22) Filed: Jun. 27, 2012

(65) Prior Publication Data

US 2014/0003704 A1     Jan. 2, 2014

(51) Int. Cl.
*G06K 9/00*     (2006.01)
*G06T 7/00*     (2006.01)

(52) U.S. Cl.
CPC ............. *G06T 7/0075* (2013.01); *G06T 7/0085* (2013.01)

(58) Field of Classification Search
None
See application file for complete search history.

(56) References Cited

U.S. PATENT DOCUMENTS

| | | | | |
|---|---|---|---|---|
| 6,215,898 | B1 * | 4/2001 | Woodfill et al. | 382/154 |
| 2002/0110272 | A1 * | 8/2002 | Brodsky | 382/154 |
| 2004/0240725 | A1 * | 12/2004 | Xu et al. | 382/154 |
| 2006/0045329 | A1 * | 3/2006 | Jones et al. | 382/154 |
| 2009/0041336 | A1 * | 2/2009 | Ku et al. | 382/154 |
| 2010/0142824 | A1 * | 6/2010 | Lu | 382/195 |
| 2010/0271511 | A1 * | 10/2010 | Ma et al. | 348/239 |
| 2010/0315488 | A1 * | 12/2010 | Kim et al. | 348/46 |
| 2010/0321390 | A1 * | 12/2010 | Kim et al. | 345/427 |
| 2010/0328427 | A1 * | 12/2010 | Sakano et al. | 348/43 |
| 2011/0210965 | A1 * | 9/2011 | Thorpe | 345/419 |
| 2013/0170736 | A1 * | 7/2013 | Guo et al. | 382/154 |

FOREIGN PATENT DOCUMENTS

WO    WO 2010087751 A1 * 8/2010

OTHER PUBLICATIONS

Hirschmuller, Heiko, and Daniel Scharstein. "Evaluation of cost functions for stereo matching." in Computer Vision and Pattern Recognition, 2007. (Jun. 17, 2007). Pages 1-8.*
Scharstein, Daniel, and Richard Szeliski. "A taxonomy and evaluation of dense two-frame stereo correspondence algorithms." International journal of computer vision 47, No. 1-3 (2002): 7-42.*
Nalpantidis, Lazaros, Angelos Amanatiadis, G. Ch Sirakoulis, and Antonios Gasteratos. "Efficient hierarchical matching algorithm for processing uncalibrated stereo vision images and its hardware architecture." IET image processing 5, No. 5 (2011): 481-492.*
Guanyu Yi, "High-Quality, Real-Time HD Video Stereo Matching on FPGA", Circuits and Systems Group, Department of Microelectronics & Computer Engineering Faculty of Electrical Engineering, Mathematics and Computer Science Delft University of Technology, Aug. 29, 2011.

(Continued)

*Primary Examiner* — Sumati Lefkowitz
*Assistant Examiner* — Carol Wang
(74) *Attorney, Agent, or Firm* — Knobbe, Martens, Olson & Bear, LLP

(57) ABSTRACT

A imaging system and method is disclosed. In one aspect, the system includes a first edge-detecting module configured to detect edge coordinates in the first image, a first disparity-estimating module configured to obtain a first estimated disparity map of the first image relative to the second image, and a first edge-refining module configured to refine edge coordinates in the first estimated disparity map using the edge coordinates in the first image to obtain a first refined disparity map. The imaging system and method improve the quality of a disparity map and control the complexity of stereo-matching.

21 Claims, 12 Drawing Sheets

(56) References Cited

OTHER PUBLICATIONS

Zhang et al., "Real-Time High-Definition Stereo Matching on FPGA", FPGA 2011, vol. 19, No. 55, Feb. 27-Mar. 1, 2011, Monterey, California, USA, pp. 55-64.

Weber et al., "A Very Fast Census-Based Stereo Matching Implementation on a Graphics Processing Unit", 2009 IEEE 12th International Conference on Computer Vision Workshops, ICCV Workshops, 2009, pp. 786-793.

Woodfill et al., "Tyzx DeepSea High Speed Stereo Vision System", Proceedings of the 2004 IEEE Computer Society Conference on Computer Vision and Pattern Recognition Workshops (CVPRW2004), 2004.

Kuhn et al., "Efficient ASIC Implementation of a Real-Time Depth Mapping Stereo Vision System", 46th IEEE International Midwest Symposium on Circuits and Systems, 2004.

Lu Zhang, "Design and Implementation of Real-Time High-Definition Stereo Matching SoC on FPGA", Computer Engineering Group, Department of Microelectronics & Computer Engineering Faculty of Electrical Engineering, Mathematics and Computer Science Delft University of Technology, Sep. 3, 2010.

* cited by examiner

IMAGING SYSTEM AND METHOD

BACKGROUND OF THE INVENTION

1. Field of the Invention

The disclosed technology relates to the field of computer vision, and more particularly to an imaging system and method that generate a depth map.

2. Description of the Related Technology

Stereo-matching estimates disparity distances between corresponding pixels in a pair of stereo images or videos captured from parallel cameras in order to extract depth information of objects in a scene. Stereo-matching has many applications such as 3D gesture recognition, viewpoint synthesis, and stereoscopic TV.

In general, imaging methods that perform stereo-matching to generate a depth map can be classified into two categories: global and local methods.

Global methods usually formulate the stereo-matching problem as an energy function with the objective to find a disparity function d that minimizes a global energy. The energy function may be expressed by the following equation.

$$E(d)=E_{data}(d)+\lambda E_{smooth}(d) \qquad (1)$$

where $E_{data}(d)$ measures how well the disparity function d agrees with the stereo image pair, and $E_{smooth}(d)$ encodes the smoothness assumptions made by the method, and measures differences between neighboring pixels' disparities. Once the energy function is formulated, it may be minimized using, for example, dynamic programming, graph cuts and belief propagation.

Local methods estimate a disparity distance of a pixel independently over a window. Matching costs for the pixel in one of the stereo images and a candidate matching pixel in the other of the stereo images are aggregated over the window. The minimum matching cost among a plurality of candidate matching pixels with different disparity distances may be identified for selection of the disparity level of the pixel on a disparity map.

For both of the methods, there exists a tradeoff between depth map quality and computational complexity. For example, for global methods, the smoothness term $E_{smooth}(d)$ in the energy function may use a larger neighborhood such as a neighborhood of 8 instead of 2 in order to obtain better boundaries. However, the computational complexity for optimizing the global energy is approaching being intractable. For local methods, the complexity is much lower than that of the global methods but at the cost of quality. To enhance quality, a higher number of bits may be used to represent a pixel so as to obtain a finer disparity map. However, matching cost calculation and aggregation is performed on per-pixel basis. With the higher number of bits per pixel, the computational complexity is significantly increased.

Therefore, it is highly desirable to provide an imaging system and method that achieve an enhanced quality of disparity map without aggravating the complexity of the more computationally intensive part of the imaging system and method.

SUMMARY OF CERTAIN INVENTIVE ASPECTS

Certain inventive aspects relate to an imaging system and method that improve the quality of a disparity map without increasing the complexity of the computationally intensive part such as disparity estimation of the imaging system and method using edge refinement. Edge refinement may even reduce the complexity of disparity estimation.

According to an embodiment, an imaging system includes a first edge-detecting module, a first disparity-estimating module, and a first edge-refining module. The first edge-detecting module is configured to detect one or more edge coordinates of at least a reference line in the first image. The first disparity-estimating module is configured to obtain a current line of a first estimated disparity map of the first image relative to a second image. The first edge-refining module is configured to refine one or more edge coordinates of the current line of the first estimated disparity map using the one or more edge coordinates of the reference line of the first image to obtain a current line of a first refined disparity map.

According to an embodiment, the first disparity-estimating module comprises: a first cost-aggregating module and a first disparity-selecting module. The first cost-aggregating module, comprising a first window buffer, is configured to obtain correlation lines of the first image and a second image, calculate current matching costs of the correlation line of the first image with respect to the correlation line of the second image for a plurality of disparity distances, aggregate matching costs using the first window buffer and the current matching costs for the plurality of disparity distances, and update the first window buffer with the current matching costs. The first disparity-selecting module is configured to select, respectively for each coordinate on a current line of a first estimated disparity map, one of the disparity distances as a disparity level at the coordinate of the first estimated disparity map. According to an embodiment, the first disparity-selecting module selects the disparity distance with the minimum aggregated matching cost respectively for each coordinate on the current line of the first estimated disparity map.

According to an embodiment, the first disparity-estimating module further comprises a first census-transforming module, comprising a first census buffer, configured to use the first census buffer and a current line of the first image to produce the correlation line of the first image, which is census transformed, and update the first census buffer with the current line of the first image. According to an embodiment, each census-transformed pixel of the correlation line of the first image is represented by a bit vector of length 4. According to an embodiment, the first cost-aggregating module calculates a hamming distance between bit vectors of the correlation lines of the first image and the second image as one of the current matching costs.

According to an embodiment, the first edge-refining module refines one of the edge coordinates of the first estimated disparity map by propagating a disparity level at the corresponding edge coordinate of the first estimated disparity map to the edge coordinate of the first image.

According to an embodiment, the imaging system further comprises a second edge-detecting module, a second disparity-estimating module, a second edge-refining module, a cross-checking module and a disparity-propagating module. The second edge-detecting module is configured to detect one or more edge coordinates of at least a reference line in the second image. The second disparity-estimating module is configured to obtain a current line of a second estimated disparity map of the second image relative to the first image. The second edge-refining module is configured to refine one or more edge coordinates of the current line of the second estimated disparity map using the one or more edge coordinates of the reference line of the second image to obtain a current line of a second refined disparity map. The cross-checking module is configured to cross check the current line of the first refined disparity map using the current line of the second refined disparity map to identify one or more mismatched disparity levels between the refined disparity maps of the first and second images. The disparity-propagating module is configured to obtain the current line of the first refined disparity map with the identified one or more mismatched disparity levels, propagate a respective nearby disparity level to where each mismatched disparity level occurs.

According to another embodiment, the imaging system further comprises a second disparity-estimating module, a cross-checking module, an edge-refining module and a disparity-propagating module. The second disparity-estimating module is configured to obtain a current line of a second estimated disparity map of the second image relative to the first image. The cross-checking module is configured to cross check the current line of the first estimated disparity map using the current line of the second estimated disparity map to identify one or more mismatched disparity levels between the estimated disparity maps of the first and second images. The edge-refining module is configured to refine one or more edge coordinates of the current line of the first estimated disparity map containing the identified one or more mismatched disparity levels using the one or more edge coordinates of the reference line of the first image to obtain a current line of a first refined disparity map. The disparity-propagating module is configured to obtain the current line of the first refined disparity map containing the identified one or more mismatched disparity levels and propagate a respective nearby disparity level to where each mismatched disparity level occurs.

According to another embodiment, a computer system includes one or more memories storing information including program routines, and one or more processing units coupled to the one or more memories for controlling the execution of the program routines. The program routines include a first edge-detecting module, a first disparity-estimating module, and a first edge-refining module. The first edge-detecting module is configured to detect edge coordinates in the first image. The first disparity-estimating module is configured to obtain a first estimated disparity map of the first image relative to the second image. The first edge-refining module is configured to refine edge coordinates in the first estimated disparity map using the edge coordinates in the first image to obtain a first refined disparity map.

According to an embodiment, the program routine further comprises a second edge-detecting module, a second disparity-estimating module, a second edge-refining module, a cross-checking module and a disparity-propagating module. The second edge-detecting module is configured to detect edge coordinates in the second image; The second disparity-estimating module is configured to obtain a second estimated disparity map of the second image relative to the first image. The second edge-refining module is configured to refine edge coordinates in the second estimated disparity map using the edge coordinates in the second image to obtain a second refined disparity map. The cross-checking module is configured to cross check the first refined disparity map using the second refined disparity map to identify one or more mismatched disparity levels between the first and second refined disparity maps. The disparity-propagating module is configured to propagate a respective nearby disparity level to where each mismatched disparity level occurs on the first refined disparity map.

According to another embodiment, the program routines further comprises a second disparity-estimating module, a cross-checking module, an edge-refining module and a disparity-propagating module. The second disparity-estimating module is configured to obtain a second estimated disparity map of the second image relative to the first image and a disparity-propagating module. The cross-checking module is configured to cross check the first estimated disparity map using the second estimated disparity map to identify one or more mismatched disparity levels between the first and second estimated disparity maps. The edge-refining module is configured to refine edge coordinates in the first estimated disparity map containing the identified one or more mismatched disparity levels using the edge coordinates in the first image to obtain a first refined disparity map. The disparity-propagating module is configured to propagate a respective nearby disparity level to where each mismatched disparity level occurs on the first refined disparity map.

According to another embodiment, an imaging method includes the steps of: detecting edge coordinates in the first image; obtaining a first estimated disparity map of the first image relative to the second image; and refining edge coordinates in the first estimated disparity map using the edge coordinates in the first image to obtain a first refined disparity map. According to an embodiment, the step of obtaining a first estimated disparity map, a disparity level on the first estimated disparity map is obtained by calculating and aggregating matching costs of a reference window overlapping with a reference pixel in the first image and a plurality of candidate matching windows each overlapping with a respective candidate matching pixel in the second image, wherein each candidate matching pixel has a different disparity distance with respect to the reference pixel; and selecting the disparity distance corresponding to one of the candidate matching pixels as a disparity level at the coordinate of the reference pixel on the first estimated disparity map. According to an embodiment, the disparity distance corresponding to the candidate matching pixel with the minimum aggregated matching cost is selected.

According to an embodiment, the step of obtaining a first estimated disparity map further comprises performing a census transform on the first image. According to an embodiment, each census-transformed pixel of the first image is represented by a bit vector of length 4. According to an embodiment, in the step of calculating and aggregating matching costs, one of the matching costs is calculated as a hamming distance between a bit vector in the reference window and a bit vector in one of the candidate matching windows.

According to an embodiment, in the step of refining edge coordinates in the first estimated disparity map, one of the edge coordinates in the first estimated disparity map is refined by propagating a disparity level at the corresponding edge coordinate of the first estimated disparity map to the edge coordinate of the first image.

According to an embodiment, the imaging method further comprises detecting edge coordinates in the second image; obtaining a second estimated disparity map of the second image relative to the first image; refining edge coordinates in the second estimated disparity map using the edge coordinates in the second image to obtain a second refined disparity map; cross-checking the first refined disparity map using the second refined disparity map to identify one or more mismatched disparity levels between the first and second refined disparity maps; and propagating reliable a respective nearby disparity levels to coordinates where the one or more each mismatched disparity levels occur on the first refined disparity map.

According to another embodiment, the imaging method further comprises obtaining a second estimated disparity map of the second image relative to the first image; cross-checking the first estimated disparity map using the second estimated disparity map to identify one or more mismatched disparity levels between the first and second estimated disparity maps;

refining edge coordinates in the first estimated disparity map containing the identified one or more mismatched disparity levels using the edge coordinates in the first image to obtain a first refined disparity map; and propagating a respective nearby disparity level to where each mismatched disparity level occur on the first refined disparity map.

According to another embodiment, a non-transitory computer-readable recording medium storing a computer program for causing a computer system to perform the above-mentioned imaging method is disclosed.

Certain additional inventive aspects and advantages will be described hereinafter. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention will become apparent upon reading the following description and upon reference to the accompanying drawings in which.

DETAILED DESCRIPTION OF CERTAIN ILLUSTRATIVE EMBODIMENTS

Figure 1:
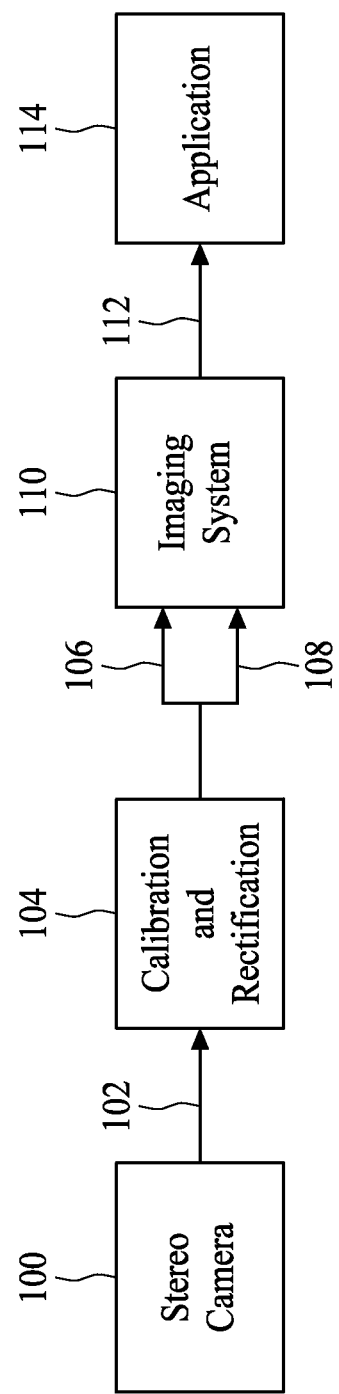
FIG. 1 is a block diagram illustrating an application of an imaging system according to an embodiment of the present invention.

FIG. 1 is a block diagram illustrating an application of an imaging system 110 according to an embodiment of the present invention. Referring to FIG. 1, in this application of the imaging system 110, a stereo camera 100 comprising two cameras aligned on an epi-polar line captures two raw images 102 or video of a scene from different view points. Depending on different applications, the cameras may be integrated in one apparatus or separately configured. A calibration and rectification block 104 calibrates the two raw images 102 to remove lens distortion and rectifies the two raw images 102 to remove co-planar and epi-polar mismatch so that the output first image 106 and second image 108 may be compared on single or multiple line-to-line basis. The imaging system 110 generates a depth map 112 using the first image 106 and the second image 108. The depth map 112 provides distance information of objects in the scene from the stereo camera 100. Because the depth map 112 can be directly calculated using a disparity map obtained by measuring disparity distances of the first image 106 and the second image 108, the disparity map will be referred to as the output of the imaging system 110 hereafter. An application block 114 can thereby use the depth map 112 to perform, for example, 3D gesture recognition, viewpoint synthesis, and stereoscopic TV presentation.

The imaging system 110 may be implemented in hardware such as in field programmable gate array (FPGA) and in application-specific integrated circuit (ASIC), or implemented in software using a general purpose computer system, or a combination thereof. Hardware implementation may achieve a higher performance compared to software implementation but at a higher design cost. For real-time applications, due to the speed requirement, hardware implementation is usually chosen.

Figure 2A:
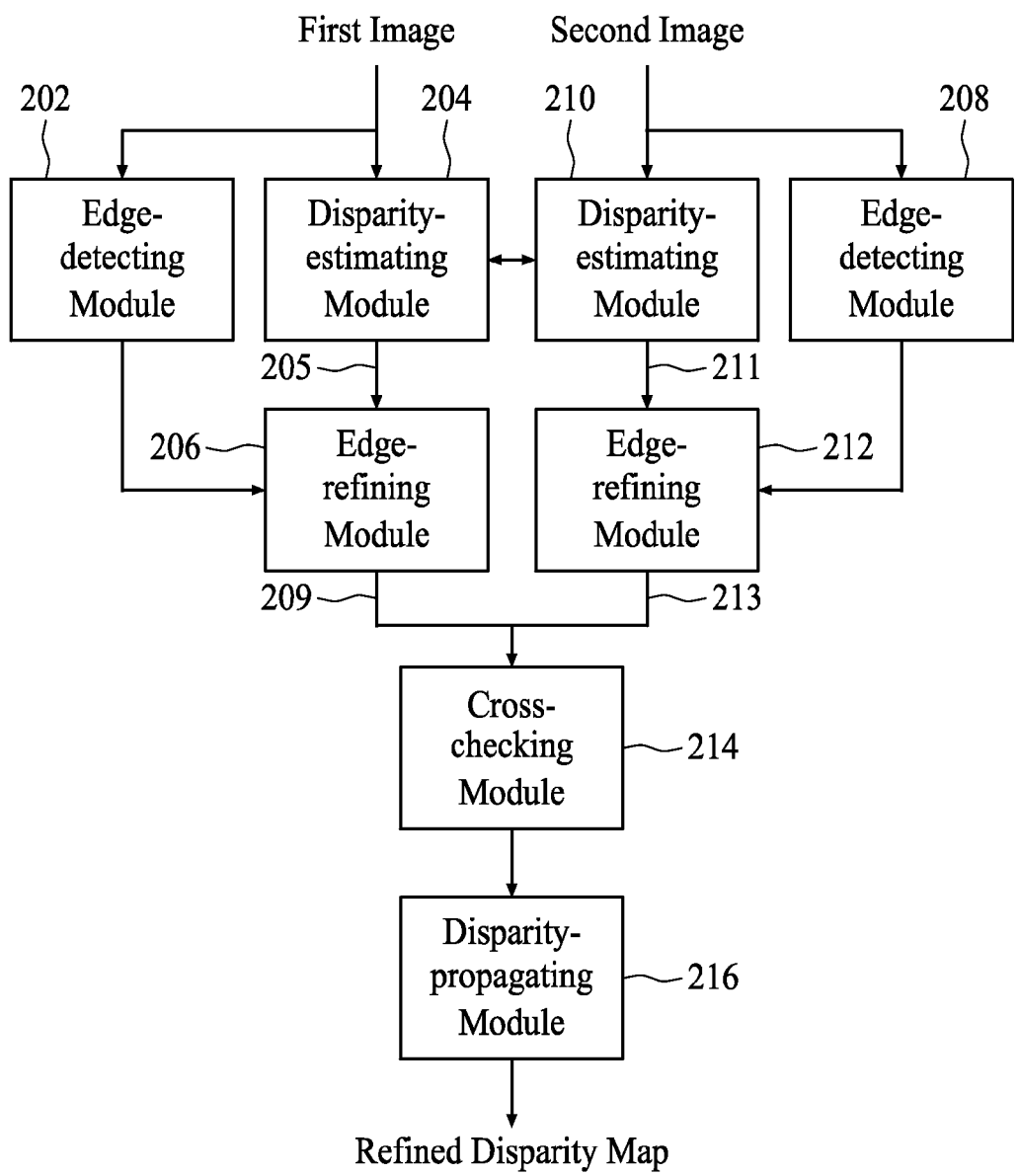
FIG. 2A is a block diagram illustrating an imaging system according to an embodiment of the present invention.
Figure 3:
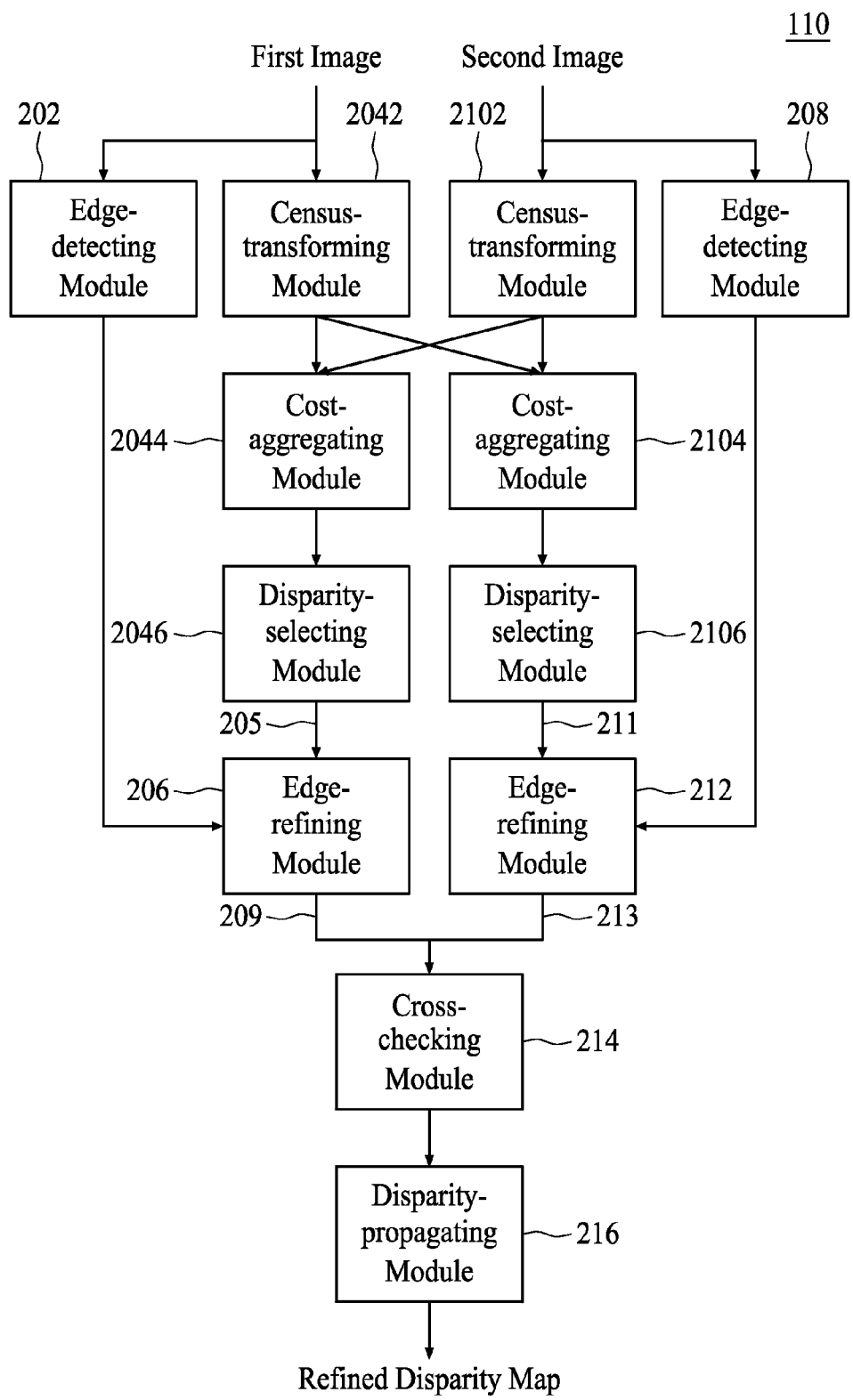
FIG. 3 is a block diagram illustrating an imaging system according to still another embodiment of the present invention.

FIGS. 2A, and 3 are block diagrams each illustrating an imaging system according to a different embodiment of the present invention. Referring to FIG. 2A, according to an embodiment, an imaging system 110 implemented in pipelined hardware receives a first image and a second image, outputs a refined disparity map, and includes first and second edge-detecting modules 202, 208, first and second disparity-estimating modules 204, 210, first and second edge refining modules 206, 212 a cross-checking module 214, and a disparity-propagating module 216.

The first edge-detecting module 202 is configured to detect one or more edge coordinates of at least a reference line in the first image. Similarly, the second edge-detecting module 212 is configured to detect one or more edge coordinates of at least a reference line in the second image. Corresponding to positions on the reference line of the first image, a current line of the refined disparity map is generated.

The first disparity-estimating module 204 is configured to receive a current line of the first image and obtain a current line of a first estimated disparity map 205 of the first image relative to the second image (as shown by the left-bound part of the double arrow in the figure). Similarity, the second disparity-estimating module 210 is configured to receive a current line of the second image and obtain a current line of a second estimated disparity map 211 of the second image relative to the first image (as shown by the right-bound part of the double arrow in the figure). The first or second disparity-estimating module 204 or 210 may be implemented using a global method or a local method. As described above, local methods have much lower complexity compared to global methods and therefore, in one embodiment of the present invention described below, a local method is adopted to achieve higher speed for, e.g. real-time applications.

Referring to FIGS. 2A and 3, according to an embodiment, the first disparity-estimating module 204 includes a first census-transforming module 2042, a first cost-aggregating module 2044 and a first disparity-selecting module 2046; the second disparity-estimating module 210 includes a second census-transforming module 2102, a second cost-aggregating module 2104 and a second disparity-selecting module 2106.

The first census-transforming module 2042, including a first census buffer (not shown), is configured to obtain a current line of the first image and use the first census buffer and the current line of the first image to produce a correlation line of the first image, which is census transformed, and update the first census buffer with the current line of the first image. According to an embodiment, the size of the first census buffer is equal to a product of a width of the first image, a bit length of a pixel and a height of 2 lines. The height is determined by neighbors used for census transformation. Similarly, the second census-transforming module 2102, including a second census buffer, is configured to obtain a current line of the second image and use the second census buffer and the current line of the second image to produce a correlation line of the second image, which is census transformed, and update the second census buffer with the current line of the second image.

The first cost-aggregating module 2044, including a first window buffer (not shown), is configured to obtain correlation lines of the first image and the second image, calculate current matching costs of the correlation line of the first image with respect to the correlation line of the second image for a plurality of disparity distances, aggregate matching costs using the first window buffer and the current matching costs for the plurality of disparity distances, and update the first window buffer with the current matching costs. According to an embodiment, as shown in the figure, the correlation lines of the first and second images are respectively obtained from the first census-transforming module 2042 and the second census-transforming module 2102. According to an embodiment, the size of the first window buffer is equal to a product of the width of the first image, a bit length of a pixel and a height of an aggregation window, which will be described in greater detail later. According to an embodiment, the bit length of a pixel is at least one. According to an embodiment, the bit length is two or three when a census transforming is performed to acquire the cost from four adjacent pixels. Similarly, the second cost-aggregating module 2104, including a second window buffer (now shown), is configured to obtain the correlation lines of the first image and the second image, calculate current matching costs of the correlation line of the second image with respect to the correlation line of the first image for a plurality of disparity distances, aggregate matching costs using the second window buffer and the current matching costs for the plurality of disparity distances, and update the second window buffer with the current matching costs. Cost aggregation in other embodiments may be performed on a non-transformed image.

The first disparity-selecting module 2046 is configured to select, respectively for each coordinate on a current line of a first estimated disparity map 205, one of the disparity distances as a disparity level at the coordinate of the first estimated disparity map 205. Similarly, the second disparity-selecting module 2106 is configured to select, respectively for each coordinate on a current line of a second estimated disparity map 211, one of the disparity distances as a disparity level at the coordinate of the second estimated disparity map.

The first edge-refining module 206 is configured to refine one or more edge coordinates of the current line of the first estimated disparity map 205 using the one or more edge coordinates of the reference line of the first image to obtain a current line of the first refined disparity map 209. Corresponding to positions of the reference line, the current line of the first refined disparity map 209 is generated on the first refined disparity map 209. Similarly, the second edge-refining module 212 is configured to refine one or more edge coordinates of the current line of the second estimated disparity map 211 using the one or more edge coordinates of the reference line of the second image to obtain a current line of a second refined disparity map 213.

The cross-checking module 214 is configured to cross check the current line of the first refined disparity map 209 using the current line of the second refined disparity map 213 to identify one or more mismatched disparity levels between the refined disparity maps 209, 213 of the first and second images. The disparity-propagating module 216 is configured to obtain the current line of the first refined disparity map with the identified one or more mismatched disparity levels, and propagate a nearby disparity level to where each mismatched disparity level occurs.

Figure 2B:
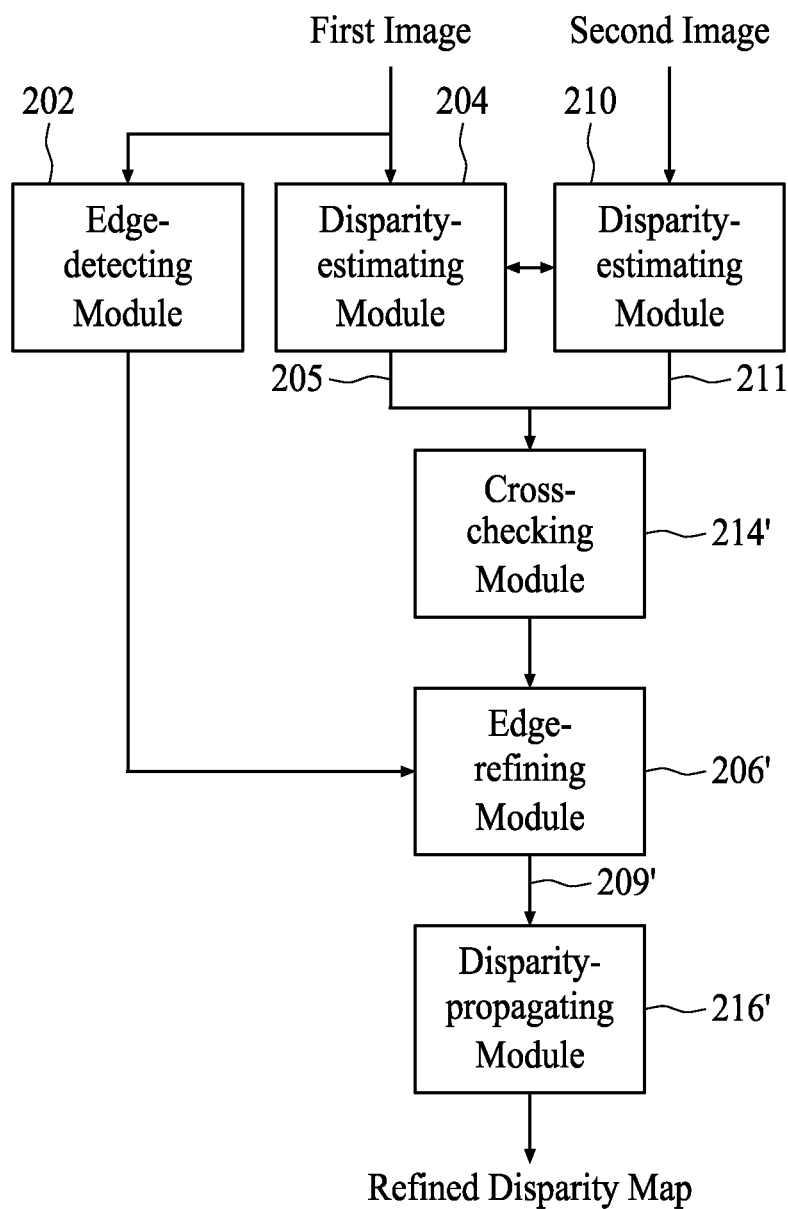
FIG. 2B is a block diagram illustrating an imaging system according to another embodiment of the present invention.

FIG. 2B is a block diagram illustrating an imaging system according to another embodiment of the present invention. Modules in FIG. 2B that are the same as those in the embodiment illustrated in FIG. 2A are labeled with the same reference numerals. The embodiment illustrated in FIG. 2B is different from the embodiment illustrated in FIG. 2A in that edge refinement is performed after cross checking. Therefore, in the embodiment shown in FIG. 2B, a cross-checking module 214' is configured to cross check the current line of the first estimated disparity map 205 using the current line of the second estimated disparity map 211 to identify one or more mismatched disparity levels between the estimated disparity maps 205 and 211 of the first and second images. An edge-refining module 206' is configured to refine one or more edge coordinates of the current line of the first estimated disparity map 205 containing the identified one or more mismatched disparity levels using the one or more edge coordinates of the reference line of the first image to obtain a current line of a first refined disparity map 209'. The disparity-estimating module 216' is configured to obtain the current line of the first refined disparity map 209' containing the identified one or more mismatched disparity levels and propagate a respective nearby disparity level to where each mismatched disparity level occurs.

According to another embodiment, the imaging system 110 is implemented using a general purpose computer system in software. The general purpose computer system includes one or more memories (not shown) for storing information including program routines, and one or more processing units (not shown) coupled to the one or more memories for controlling execution of the program routines including software modules. Referring to FIG. 2A, according to an embodiment, the program routine includes first and second edge-detecting modules 202, 208, a first and second disparity-estimating modules 204, 210, a first and second edge-refining modules 206, 212, a cross-checking module 214, and a disparity-propagating module 216.

The first edge-detecting module 202 is configured to detect edge coordinates in the first image. Similarly, the second edge-detecting module 208, configured to detect edge coordinates in the second image. The first disparity-estimating module 204 is configured to obtain a first estimated disparity map 205 of the first image relative to the second image (as shown by the left-bound part of the double arrow in the figure). Similarly, the second disparity-estimating module 210 configured to obtain a second estimated disparity map 211 of the second image relative to the first image (as shown by the right-bound part of the double arrow in the figure). The first edge-refining module 206 is configured to refine edge coordinates in the first estimated disparity map 205 using the edge coordinates in the first image to obtain a first refined disparity map 209. Similarly, the second edge-refining module 212 is configured to refine edge coordinates in the second estimated disparity map 211 using the edge coordinates in the second image to obtain a second refined disparity map 213.

The cross-checking module 214 is configured to cross check the first refined disparity map 209 using the second refined disparity map 213 to identify one or more mismatched disparity levels between the first and second refined disparity maps 209, 213. The disparity-propagating module 216 is configured to propagate a nearby disparity level to where each mismatched disparity levels occurs on the first refined disparity map 209.

Referring to FIG. 2B, according to another embodiment, the program routine includes an edge-detecting modules 202, a first and second disparity-estimating modules 204, 210, a cross-checking module 214', a first edge-refining modules 206', and a disparity-propagating module 216'.

The first edge-detecting module 202 is configured to detect edge coordinates in the first image. The first disparity-estimating module 204 is configured to obtain a first estimated disparity map 205 of the first image relative to the second image (as shown by the left-bound part of the double arrow in the figure). Similarly, the second disparity-estimating module 210 configured to obtain a second estimated disparity map 211 of the second image relative to the first image (as shown by the right-bound part of the double arrow in the figure). The cross-checking module 214' is configured to cross check the first estimated disparity map 205 using the second estimated disparity map 211 to identify one or more mismatched disparity levels between the first and second estimated disparity maps 205, 211. The edge-refining module 206' is configured to refine edge coordinates in the first estimated disparity map 205 using the edge coordinates in the first image to obtain a first refined disparity map 209'. The disparity-propagating module 216' is configured to propagate a nearby disparity level to where each mismatched disparity levels occurs on the first refined disparity map 209'.

The above described embodiments are only examples of the imaging system 110 and alternative equivalent implementations are possible. For example, the order of operations in the modules may be different, and not all modules are required, which will become more apparent from the following description. Detail operations of the modules may be directly derived from the following description for a imaging method according to an embodiment of the present invention.

Figure 4A:
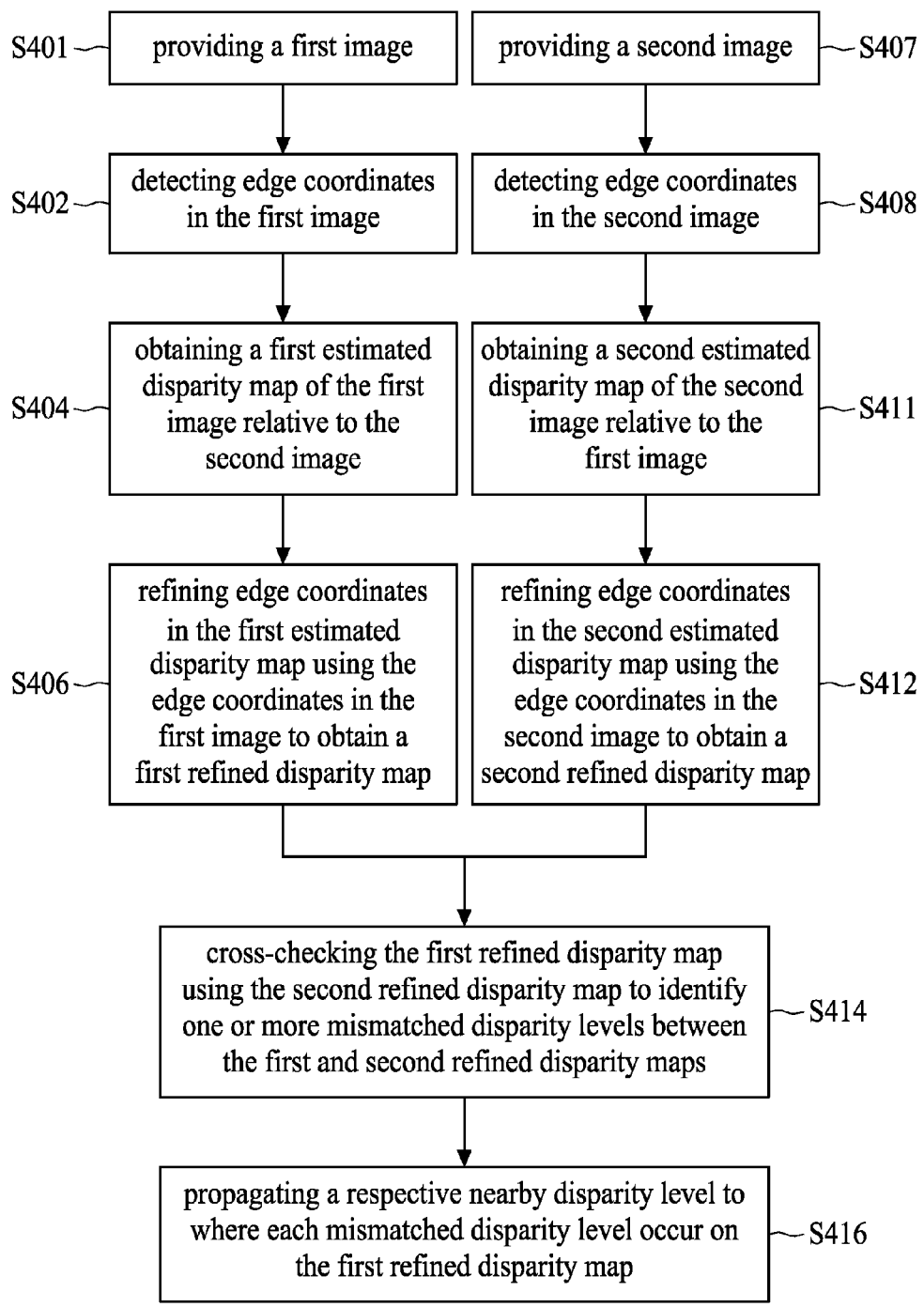
FIG. 4A is a flow chart illustrating an imaging method according to still another embodiment of the present invention.
Figure 4B:
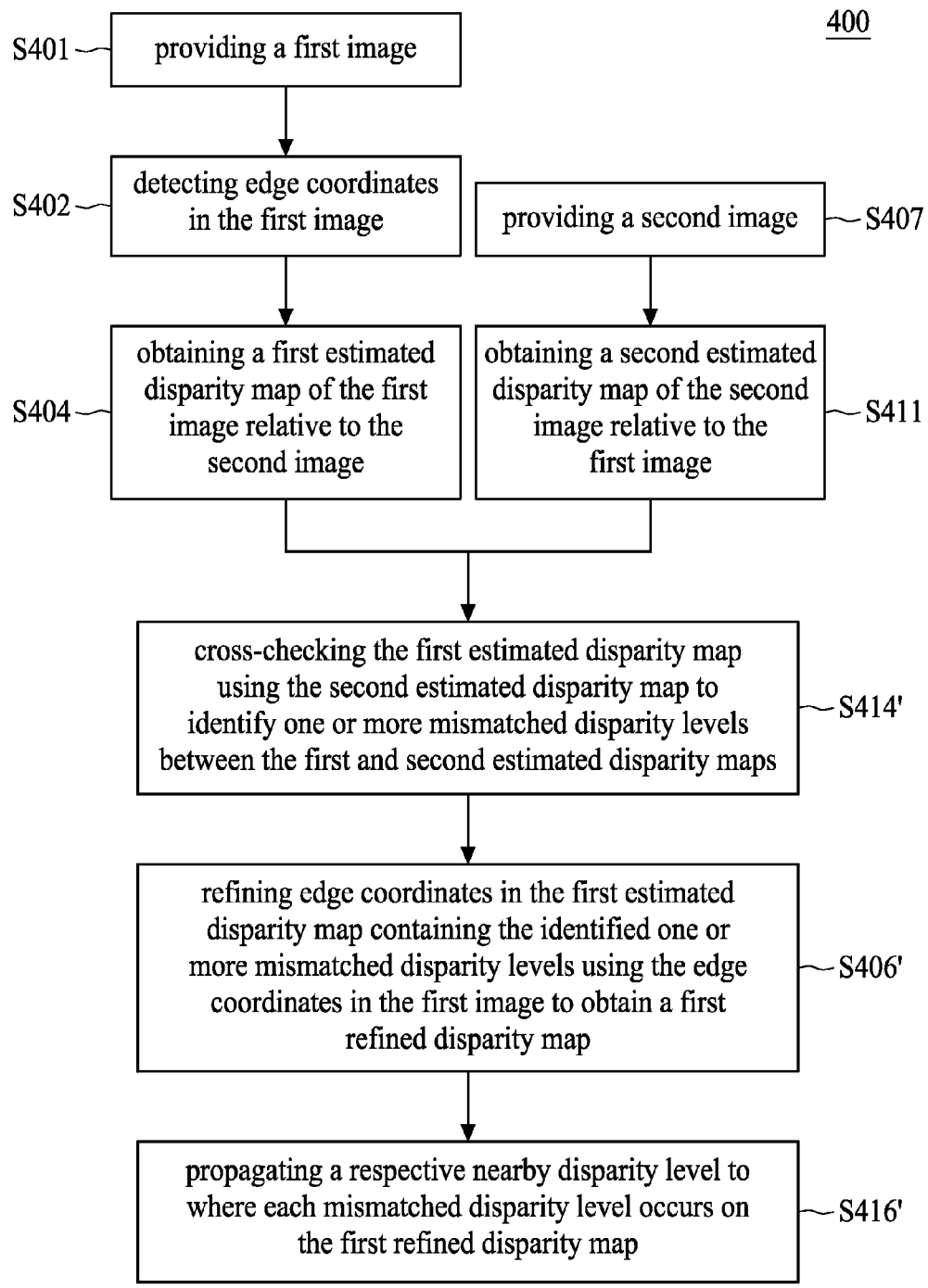
FIG. 4B is a flow chart illustrating an imaging method according to still another embodiment of the present invention.
Figure 5:
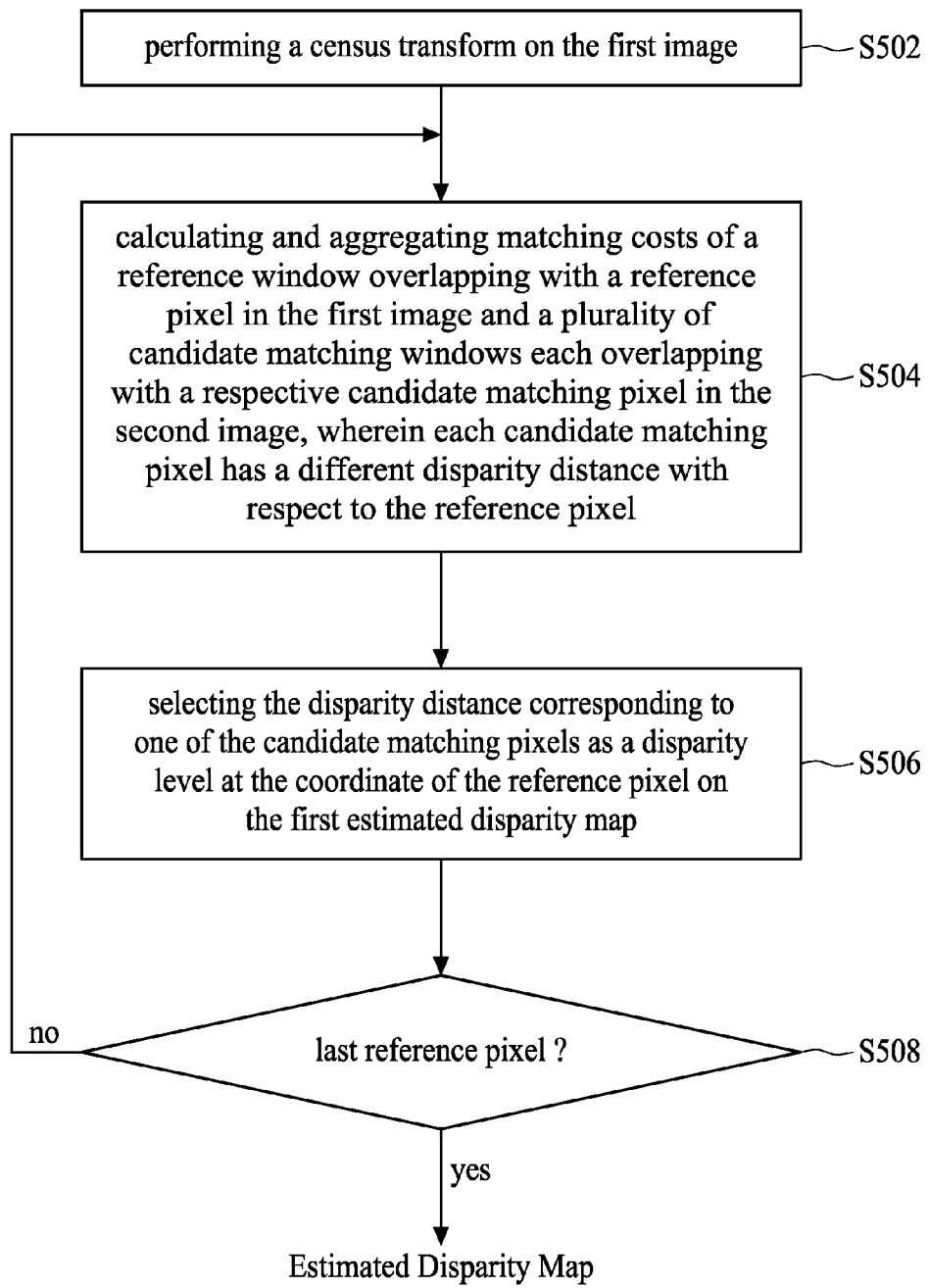
FIG. 5 is a flow chart illustrating a disparity-estimating step carried out with a local method according to an embodiment of the present invention.
Figure 6:
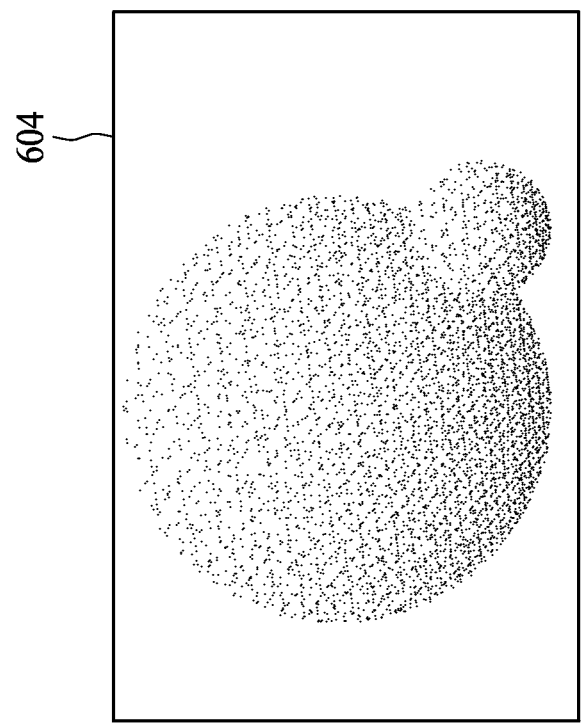
FIG. 6 is a schematic diagram illustrating first and second images on which stereo-matching is performed.
Figure 6:
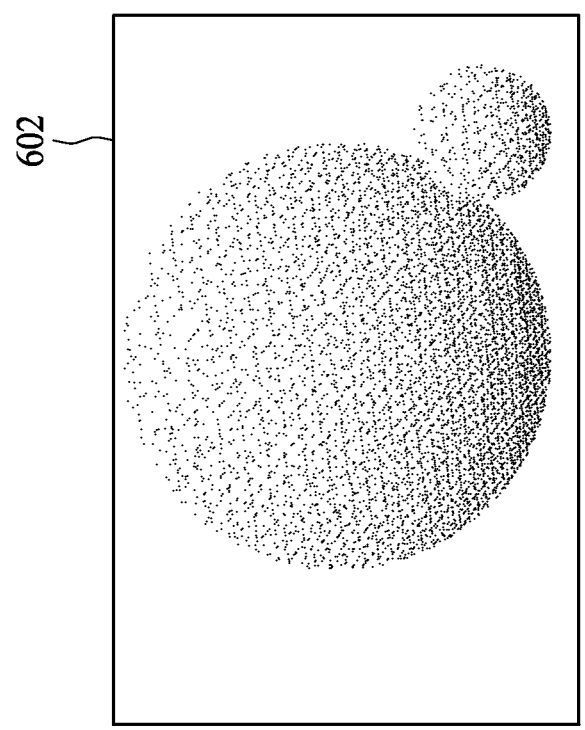
Figure 7:
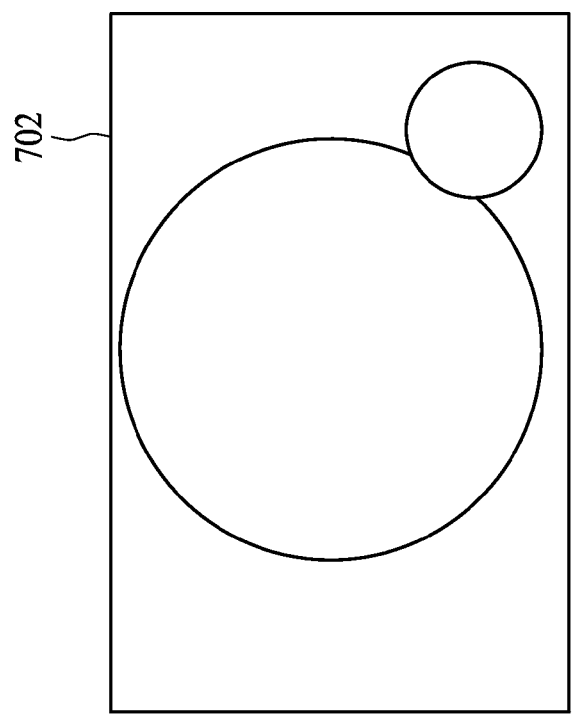
FIG. 7 is a schematic diagram illustrating edge maps according to an embodiment of the present invention.
Figure 7:
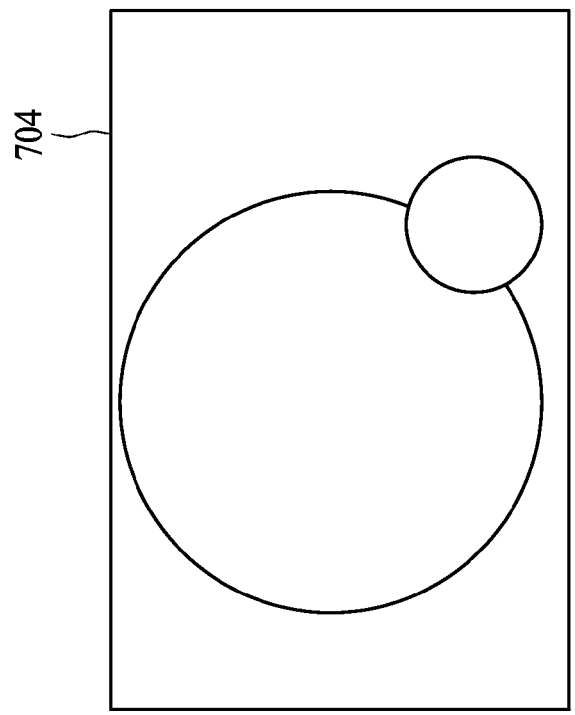
Figure 8:
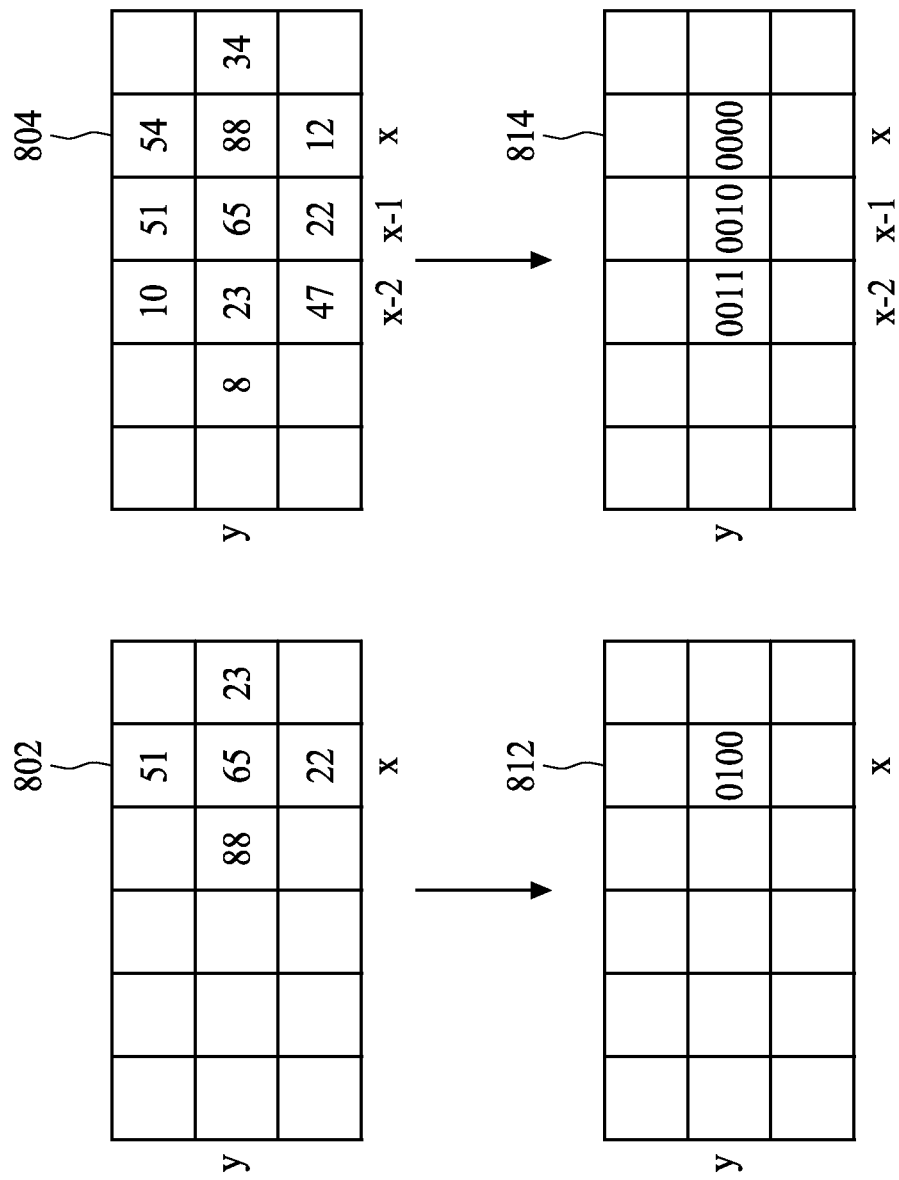
FIG. 8 is a schematic diagram illustrating census transformation according to an embodiment of the present invention.
Figure 9:
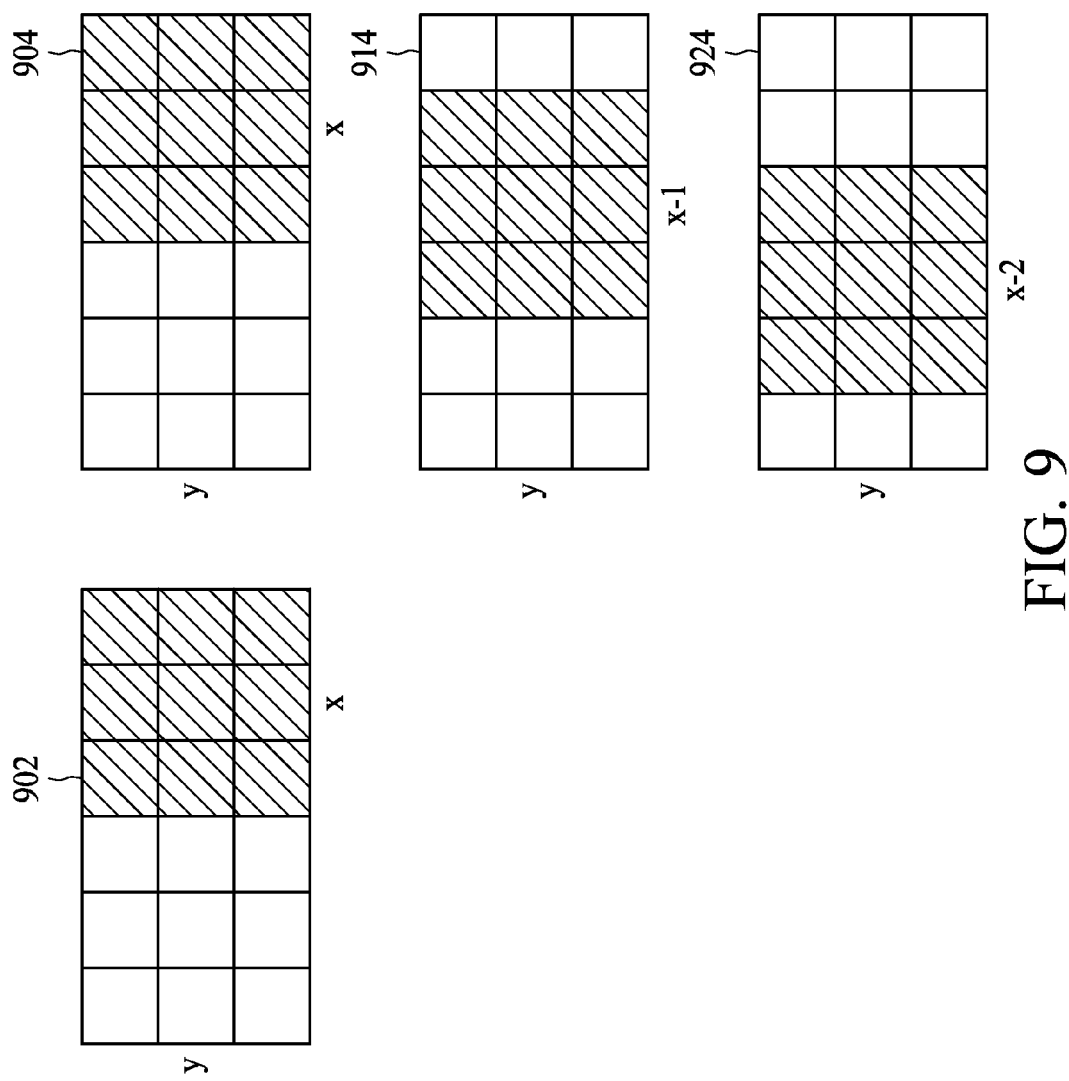
FIG. 9 is a schematic diagram illustrating cost aggregation according to an embodiment of the present invention.
Figure 10:
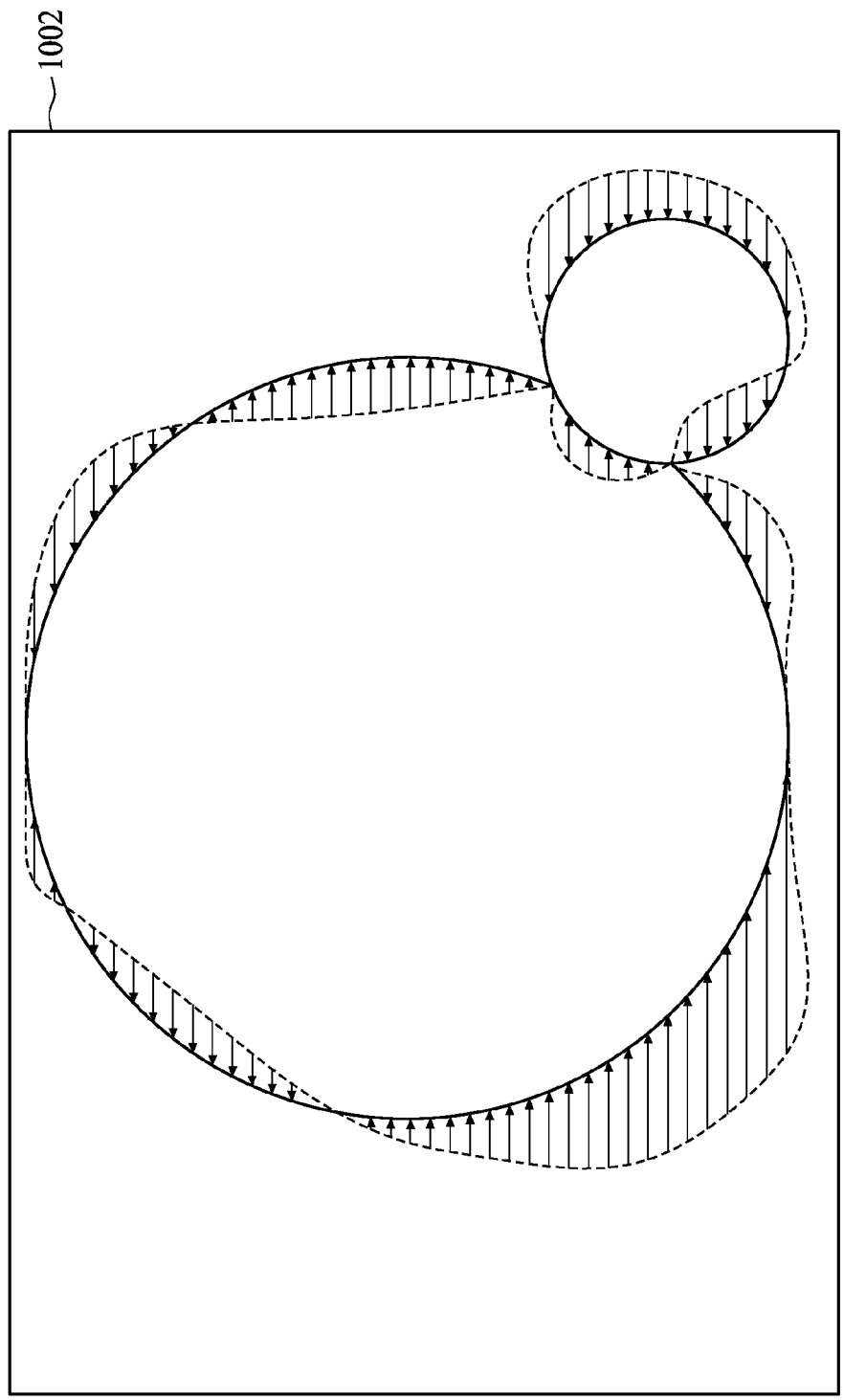
FIG. 10 is a schematic diagram illustrating an edge-refining step according to an embodiment of the present invention.

FIGS. 4A and 4B are flow charts illustrating an imaging method according to different embodiments of the present invention. FIG. 5 is a flow chart illustrating a disparity-estimating step carried out with a local method according to an embodiment of the present invention. FIG. 6 is a schematic diagram illustrating first and second images on which stereo-matching is performed. FIG. 7 is a schematic diagram illustrating edge maps according to an embodiment of the present invention. FIG. 8 is a schematic diagram illustrating a census-transforming step according to an embodiment of the present invention. FIG. 9 is a schematic diagram illustrating a cost-aggregating step according to an embodiment of the present invention. FIG. 10 is a schematic diagram illustrating an edge-refining step according to an embodiment of the present invention.

According to an embodiment, the imaging method is a computer-implemented method and may be stored on a non-transitory computer-readable recording medium for causing a computer system to perform the imaging method. Referring to FIG. 4A, according to an embodiment, the imaging method includes the steps of: providing a first image (S401); providing a second image (S407); detecting edge coordinates in the first image (S402); obtaining a first estimated disparity map of the first image relative to the second image (S404); and refining edge coordinates in the first estimated disparity map using the edge coordinates in the first image to obtain a first refined disparity map (S406).

Referring to FIGS. 4A and 6, in steps S401 and S407, the first and second images are provided. As described above and shown in FIG. 6, the first image 602 and the second image 604 are rectified so that aligned horizontal lines in the first image 602 and second image 604 may be matched pixel-to-pixel. In this embodiment, the first image 602 is a left-view image and the second image 604 is a right-view image. In different embodiments, the first image may be a right-view image and the second image may be a left-view image.

Referring to FIGS. 4A, 6 and 7, In step S402, edge coordinates in the first image 602 is detected to obtain a first edge map 702. In the first edge map 702, coordinates corresponding to pixels of object boundaries in the first image 602 are marked. Sharp object boundaries may be obtained using appropriate edge-detection techniques known in the art.

Then, referring to FIGS. 4A and 6, in step S404, a first estimated disparity map of the first image 602 relative to the second image 604 is obtained. The first estimated disparity map may be obtained using a global method or a local method. As described above, the global method formulates the stereo-matching problem as an energy function which may be expressed by equation (1). The energy function includes a smoothness term $E_{smooth}(d)$ that may cause the first estimated disparity map to be smooth everywhere and therefore blur object boundaries and affect quality of the disparity map.

Referring to FIGS. 4A, 5, 6 and 9, according to an embodiment, the disparity-estimating step S404 is carried out with a local method including the following steps. In FIG. 9, the grid 902 represents a portion of pixels of the first image 602, and the grids 904, 914, 924 represent a portion of pixels in the second image. In step S504, matching costs of a reference window (the hatched portion in the grid 902) overlapping with a reference pixel with coordinate (x, y) in the first image 602, and a plurality of candidate matching windows (the hatched portions in the grids 904, 914 and 924) overlapping with respective candidate matching pixels e.g. with coordinates (x, y), (x−1, y), (x−2, y) . . . (x−$d_{max}$, y) in the second image 604 are calculated and aggregated. Each candidate matching pixel with coordinate (x, y), (x−1, y), (x−2, y), . . . or (x−$d_{max}$, y) has a different disparity distance d=0, d=−1, d=−2 . . . , d=−$d_{max}$ with respect to the reference pixel (x, y). Then in step S506, the disparity distance d corresponding to one of the candidate matching pixels is selected as a disparity level at the coordinate (x, y) of the reference pixel on the first estimated disparity map according to the aggregated matching costs. In one embodiment, the disparity distance corresponding to the candidate matching pixel with the minimum aggregated matching cost is selected. Then in step S508, if the processed reference pixel at coordinate (x, y) is the last reference pixel in the first image 602, the first estimated disparity map is completed; otherwise, steps S504 and S506 are repeated. The cost aggregating step S504 reduces the disturbance of noise on the first image 602 to the precision of the disparity map; however, it blurs object boundaries and affects the quality of the disparity map.

Referring to FIGS. 5 and 6, According to different embodiments, the aggregated matching costs C in step S504 may be calculated using sum of absolute differences (SAD), sum of squared differences (SSD) or normalized cross-correlation (NCC), respectively shown in equations (2)-(4).

$$C_{SAD} = \sum_{x,y} |I_1(x, y) - I_2(x - d, y)| \quad (2)$$

$$C_{SSD} = \sum_{x,y} (I_1(x, y) - I_2(x - d, y))^2 \quad (3)$$

$$C_{NCC} = \frac{\sum_{x,y} (I_1(x, y) \cdot I_2(x - d, y))}{\sqrt{\sum_{x,y} (I_1(x, y) \cdot I_2(x - d, y))^2}} \quad (4)$$

where x and y are coordinates of a reference pixel, d is a disparity distance, and $I_1$ and $I_2$ represent pixel intensities of the first and second images 602, 604, respectively.

Referring to FIGS. 5, 6 and 8, according to another embodiment, the step S404 further includes a step S502 that performs a census transform on the first image 602. For example, in FIG. 8, the grid 802 shows a portion of pixel intensities of pixels in the first image 602. Census-transforming a pixel with coordinate (x, y) in the first image 602 involves comparing a pixel intensity of the pixel with pixel intensities of its neighboring pixels, respectively, to obtain a bit vector as shown in the grid 812 at coordinate (x, y). According to an embodiment, each pixel is compared with the immediate four neighboring pixels to obtain a bit vector of length 4. Compared to a pixel represented as the above-mentioned pixel intensity, a census-transformed pixel has a significantly shorter bit length. Similarly, the second image 604 is also census transformed. The grid 804 shows a portion of pixel intensities of pixels in the second image 604 and the grid 814 shows census-transformed pixels. For the census-transformed images, the aggregated matching costs C in step S504 may be calculated using Hamming Distance (HD) shown in equation (5):

$$C_{HD} = \sum_{x,y} HD(BitVec_1(x,y), BitVec_2(x-d,y)) \quad (5)$$

where x and y are coordinates of a reference pixel, d is a disparity distance, and $BitVec_1$ and $BitVec_2$ represent bit vectors of census-transformed pixels of the first and second images 602, 604, respectively.

Referring to FIGS. 4, 5, 6 and 10, because the quality of the estimated disparity map may be affected by the smoothness term in the global method, the cost aggregation and/or census transformation in the local method, in step S406, edge coordinates in the first estimated disparity map are refined using edge coordinates in the first image 602 to obtain a first refined disparity map 1002 as shown in FIG. 10. According to an embodiment, the edge coordinates (shown by the dashed line in FIG. 10) in the first estimated disparity map are refined by propagating disparity levels at the edge coordinates of the first estimated disparity map to the edge coordinates (shown by the solid line in FIG. 10) of the first image. The term "propagating" used throughout the application means to replace a disparity level at a destination pixel with a disparity level at an original pixel. The edge-refining step S406 improves the quality of the disparity map without increasing the complexity of the computationally intensive disparity-estimating step S404. The edge-refining step S406 may even help to reduce the complexity of the disparity-estimating step S404 by allowing using more compact representation of pixels such as in the embodiment involving the census-transforming step S502.

Referring to FIGS. 4A, 6, 7 and 10, according to an embodiment, the imaging method further includes the following steps. In step S408, edge coordinates in the second image 604 are detected, as shown by the second edge map 704 in FIG. 7. Then in step S411, a second estimated disparity map of the second image 604 relative to the first image 602 is obtained. The details of step S411 are similar to the step S404 described above, except that the reference pixels are now located in the second image 602. Next, in step S412, edge coordinates in the second estimated disparity map are refined using the edge coordinates in the second image 604 to obtain a second refined disparity map (not shown, but similar to FIG. 10). Then in step S414, cross-checking is performed on the first refined disparity map 1002 using the second refined disparity map to identify one or more mismatched disparity levels between the first and second refined disparity maps. Next in step S416, a respective nearby disparity level is propagated to where the each mismatched disparity level occurs on the first refined disparity map 1002. The respective nearby disparity level of each mismatched disparity level may be obtained using appropriate techniques known in the art.

In step S414, cross-checking is performed on the first refined disparity map using the second refined disparity map. In general, disparity levels of the object in the first estimated disparity map and the second estimated disparity map should be the same. Depending on locations of the view points, a portion of the object may be occluded in one of the images and is only visible in the other image. The cross-checking step S414 detects the occluded portion of the object and other mismatched portions. According to an embodiment, the cross-checking step S414 is performed based on a constraint shown below:

$$D(x,y) - D'(x - D(x,y), y)| \leq \lambda \quad (6)$$

where D and D' respectively represent the first and second estimated disparity map, and $\lambda$ is a predetermined cross-checking threshold.

Referring to FIGS. 4B, 6 and 10, according to an alternative embodiment, the imaging method further includes the following steps. In step S411, a second estimated disparity map of the second image 604 relative to the first image 602 is obtained. The details of step S411 are similar to the step S404 described above, except that the reference pixels are now located in the second image 602. Next, in step S414', cross-checking is performed on the first estimated disparity map using the second estimated disparity map to identify one or more mismatched disparity levels between the first and second estimated disparity maps. Next, in step S406', edge coordinates in the first estimated disparity map containing the identified one or more mismatched disparity levels are refined using the edge coordinates in the first image 602 to obtain a first refined disparity map (similar to FIG. 10 except the mismatched disparity levels are marked). Then, in step in step S416', a respective nearby disparity level is propagated to where the each mismatched disparity level occurs on the first refined disparity map. The respective nearby disparity level of each mismatched disparity level may be obtained using appropriate techniques known in the art.

In the above-mentioned embodiments, the first refined disparity map is generated from the first estimated disparity map of the first image. In different embodiments, a second refined disparity map may be generated alternatively or in addition to the first refined disparity map from the second estimated disparity map of the second image. Since the framework and details for generating the second refined disparity map are similar to those for generating the first refined disparity map, they are omitted for brevity.

It is noted that the processing loop shown in FIG. 5 is only one example, and alternative equivalent implementations are possible. For example, the census-transforming step S502 may be performed region by region and included in the processing loop; or the first estimated disparity map may be generated and refined line by line as in the hardware pipelined embodiment described above.

The foregoing embodiments relate to a imaging system and method that improve the quality of a disparity map without increasing the complexity of the computationally intensive part such as disparity estimation of the imaging system and method using edge refinement. Edge refinement may even reduce the complexity of disparity estimation. With the improved quality of the disparity map and controlled complexity, these embodiments may be suitable for applications such as 3D gesture recognition, view point synthesis and stereoscopic TV.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An imaging system comprising:
 a first edge-detecting module configured to detect one or more edge coordinates of at least a reference line in a first image;
 a first disparity-estimating module configured to obtain a current line of a first estimated disparity map of the first image relative to a second image the first disparity estimating module comprising:
 a first cost-aggregating module comprising a first window buffer and being configured to obtain correlation lines of the first image and a second image, calculate current matching costs of the correlation line of the first image with respect to the correlation line of the second image for a plurality of disparity distances, aggregate matching costs using the first window buffer and the current matching costs for the plurality of disparity distances, and update the first window buffer with the current matching costs; and
 a first disparity-selecting module configured to select, respectively for each coordinate on a current line of the first estimated disparity map, one of the disparity distances as a disparity level at the coordinate of the first estimated disparity map;
 a first edge-refining module configured to refine one or more edge coordinates of the current line of the first estimated disparity map using the one or more edge coordinates of the reference line of only the first image to obtain a current line of a first refined disparity map; and
 a computing device configured to execute the modules,
 wherein each of the reference line, correlation lines and current line comprises a plurality of edge coordinates representative of object edges in the images.

2. The imaging system according to claim 1, wherein the first disparity-estimating module further comprises:
 a first census-transforming module comprising a first census buffer and being configured to use the first census buffer and a current line of the first image to produce the correlation line of the first image, which is census transformed, and to update the first census buffer with the current line of the first image, wherein each census-transformed pixel of the correlation line of the first image is represented by a bit vector of length 4.

3. The imaging system according to claim 1, wherein the first edge-refining module refines one of the edge coordinates of the first estimated disparity map by propagating a disparity level at the corresponding edge coordinate of the first estimated disparity map to the edge coordinate of the first image.

4. The imaging system according to claim 1, further comprising:
 a second edge-detecting module configured to detect one or more edge coordinates of at least a reference line in the second image;
 a second disparity-estimating module configured to obtain a current line of a second estimated disparity map of the second image relative to the first image;
 a second edge-refining module configured to refine one or more edge coordinates of the current line of the second estimated disparity map using the one or more edge coordinates of the reference line of the second image to obtain a current line of a second refined disparity map;
 a cross-checking module configured to cross check the current line of the first refined disparity map using the current line of the second refined disparity map to identify one or more mismatched disparity levels between the refined disparity maps of the first and second images; and
 a disparity-propagating module configured to obtain the current line of the first refined disparity map containing the identified one or more mismatched disparity levels, and propagate a respective nearby disparity level to where each mismatched disparity level occurs.

5. The imaging system according to claim 1, further comprising:
 a second disparity-estimating module configured to obtain a current line of a second estimated disparity map of the second image relative to the first image;
 a cross-checking module configured to cross check the current line of the first estimated disparity map using the current line of the second estimated disparity map to identify one or more mismatched disparity levels between the estimated disparity maps of the first and second images;
 an edge-refining module configured to refine one or more edge coordinates of the current line of the first estimated disparity map containing the identified one or more mismatched disparity levels using the one or more edge coordinates of the reference line of the first image to obtain a current line of a first refined disparity map; and
 a disparity-propagating module configured to obtain the current line of the first refined disparity map containing the identified one or more mismatched disparity levels and propagate a respective nearby disparity level to where each mismatched disparity level occurs.

6. A computer system comprising:
 one or more memories storing information program routines comprising:
 a first edge-detecting module configured to detect edge coordinates in a first image;

a first disparity-estimating module configured to obtain a first estimated disparity map of the first image relative to a second image, the first disparity-estimating module comprising:
  a first cost-aggregating module configured to obtain correlation lines of the first image and the second image, calculate current matching costs of a correlation line of the first image with respect to a correlation line of the second image for a plurality of disparity distances, and aggregate matching costs and the current matching costs for the plurality of disparity distances, and
  a first disparity-selecting module configured to select, respectively for each coordinate on a current line of the first estimated disparity map, one of the disparity distances as a disparity level at the coordinate of the first estimated disparity map; and
a first edge-refining module configured to refine edge coordinates in the first estimated disparity map using the edge coordinates in only the first image to obtain a first refined disparity map; and
one or more processing units coupled to the one or more memories for controlling the execution of the modules,
wherein each of the correlation lines and current line comprises a plurality of edge coordinates representative of object edges in the images.

7. The computer system according to claim 6, wherein the disparity-estimating module obtains a disparity level on the first estimated disparity map by:
  calculating and aggregating matching costs of a reference window overlapping with a reference pixel in the first image and a plurality of candidate matching windows each overlapping with a respective candidate matching pixel in the second image, wherein each candidate matching pixel has a different disparity distance with respect to the reference pixel; and
  selecting the disparity distance corresponding to one of the candidate matching pixels as a disparity level at the coordinate of the reference pixel on the first estimated disparity map.

8. The computer system according to claim 7, wherein the disparity-estimating module is further configured to perform a census transform on the first image.

9. The computer system according to claim 8, wherein each census-transformed pixel of the first image is represented by a bit vector of length 4.

10. The computer system according to claim 6, wherein the edge-refining module refines one of the edge coordinates in the first estimated disparity map by propagating a disparity level at the corresponding edge coordinate of the first estimated disparity map to the edge coordinate of the first image.

11. The computer system according to claim 6, wherein the program routines further comprises:
  a second edge-detecting module configured to detect edge coordinates in the second image;
  a second disparity-estimating module configured to obtain a second estimated disparity map of the second image relative to the first image;
  a second edge-refining module configured to refine edge coordinates in the second estimated disparity map using the edge coordinates in the second image to obtain a second refined disparity map;
  a cross-checking module configured to cross check the first refined disparity map using the second refined disparity map to identify one or more mismatched disparity levels between the first and second refined disparity maps; and
  a disparity-propagating module configured to propagate a respective nearby disparity level to where each mismatched disparity level occurs on the first refined disparity map.

12. The computer system according to claim 6, wherein the program routines further comprises:
  a second disparity-estimating module configured to obtain a second estimated disparity map of the second image relative to the first image;
  a cross-checking module configured to cross check the first estimated disparity map using the second estimated disparity map to identify one or more mismatched disparity levels between the first and second estimated disparity maps;
  an edge-refining module configured to refine edge coordinates in the first estimated disparity map containing the identified one or more mismatched disparity levels using the edge coordinates in the first image to obtain a first refined disparity map; and
  a disparity-propagating module configured to propagate a respective nearby disparity level to where each mismatched disparity level occurs on the first refined disparity map.

13. An imaging method comprising:
  providing a first and a second image;
  detecting edge coordinates in the first image;
  obtaining a first estimated disparity map of the first image relative to the second image; comprising:
    obtaining correlation lines of the first image and the second image,
    calculating current matching costs of a correlation line of the first image with respect to a correlation line of the second image for a plurality of disparity distances;
    aggregating matching costs and the current matching costs for the plurality of disparity distances, and
    selecting, respectively for each coordinate on a current line of the first estimated disparity map, one of the disparity distances as a disparity level at the coordinate of the first estimated disparity map; and
  refining edge coordinates in the first estimated disparity map using the edge coordinates in only the first image to obtain a first refined disparity map,
  wherein each of the correlation lines and current line comprises a plurality of edge coordinates representative of object edges in the images.

14. The imaging method according to claim 13, wherein obtaining a first estimated disparity map comprises obtaining a disparity level on the first estimated disparity map by:
  calculating and aggregating matching costs of a reference window overlapping with a reference pixel in the first image and a plurality of candidate matching windows each overlapping with a respective candidate matching pixel in the second image, wherein each candidate matching pixel has a different disparity distance with respect to the reference pixel; and
  selecting the disparity distance corresponding to one of the candidate matching pixels as a disparity level at the coordinate of the reference pixel on the first estimated disparity map.

15. The imaging method according to claim 14, wherein obtaining a first estimated disparity map comprises performing a census transform on the first image.

16. The imaging method according to claim 15, wherein each census-transformed pixel of the first image is represented by a bit vector of length 4.

17. The imaging method according to claim 13, wherein refining edge coordinates in the first estimated disparity map comprises refining one of the edge coordinates in the first estimated disparity map by propagating a disparity level at the corresponding edge coordinate of the first estimated disparity map to the edge coordinate of the first image.

18. The imaging method according to claim 13, further comprising:
   detecting edge coordinates in the second image;
   obtaining a second estimated disparity map of the second image relative to the first image;
   refining edge coordinates in the second estimated disparity map using the edge coordinates in the second image to obtain a second refined disparity map;
   cross-checking the first refined disparity map using the second refined disparity map to identify one or more mismatched disparity levels between the first and second refined disparity maps; and
   propagating a respective nearby disparity level to where each mismatched disparity level occur on the first refined disparity map.

19. The imaging method according to claim 13, further comprising:
   obtaining a second estimated disparity map of the second image relative to the first image;
   cross-checking the first estimated disparity map using the second estimated disparity map to identify one or more mismatched disparity levels between the first and second estimated disparity maps;
   refining edge coordinates in the first estimated disparity map containing the identified one or more mismatched disparity levels using the edge coordinates in the first image to obtain a first refined disparity map; and
   propagating a respective nearby disparity level to where each mismatched disparity level occur on the first refined disparity map.

20. A non-transitory computer-readable medium having stored therein instructions which, when executed by a process, performs the imaging method according to claim 13.

21. An imaging system comprising:
   means for providing a first and a second image;
   means for detecting edge coordinates in the first image;
   means for obtaining a first estimated disparity map of the first image relative to the second image, comprising:
      means for obtaining correlation lines of the first image and the second image;
      means for calculating current matching costs of a correlation line of the first image with respect to a correlation line of the second image for a plurality of disparity distances;
      means for aggregating matching costs and the current matching costs for the plurality of disparity distances,
      means for selecting, respectively for each coordinate on a current line of the first estimated disparity map, one of the disparity distances as a disparity level at the coordinate of the first estimated disparity map; and
   means for refining edge coordinates in the first estimated disparity map using the edge coordinates in only the first image to obtain a first refined disparity map,
   wherein each of the correlation lines and current line comprises a plurality of edge coordinates representative of object edges in the images.

\* \* \* \* \*